United States Patent [19]

Friedle

[11] Patent Number: 4,653,552
[45] Date of Patent: Mar. 31, 1987

[54] FUEL TANK CAP

[75] Inventor: Dennis J. Friedle, Lake Villa, Ill.

[73] Assignee: Outboard Marine Corporation, Waukegan, Ill.

[21] Appl. No.: 779,927

[22] Filed: Sep. 25, 1985

[51] Int. Cl.⁴ .............................................. B65B 3/04
[52] U.S. Cl. ...................................... 141/98; 141/35; 141/301
[58] Field of Search .................... 141/35, 98, 348–362, 141/289–310, 65, 66

[56] References Cited

U.S. PATENT DOCUMENTS

| | | | |
|---|---|---|---|
| 941,268 | 11/1909 | Nolley | 141/353 |
| 2,291,617 | 8/1942 | Freygang | 141/353 |
| 2,401,674 | 6/1946 | Vizay | 141/353 |
| 2,665,926 | 1/1954 | Fraser | 284/18 |
| 2,735,696 | 2/1956 | Omon et al. | 284/19 |
| 2,753,884 | 7/1956 | Lindsay | 137/322 |
| 3,144,172 | 8/1964 | Mason | 222/51 |
| 3,158,193 | 11/1964 | Anderson | 158/36.3 |
| 3,409,040 | 11/1968 | Weston et al. | 137/352 |
| 3,687,161 | 8/1972 | Grguric | 137/614 |
| 3,939,860 | 2/1924 | Golding | 137/212 |

Primary Examiner—Houston S. Bell, Jr.
Attorney, Agent, or Firm—John T. Synnestvedt; Richard D. Weber

[57] ABSTRACT

A fuel tank cap having a fuel inlet passage therein includes an arrangement automatically closing the fuel inlet passage when the cap is removed from the tank. A valve in the fuel inlet passage is spring biased toward a closed position. A valve actuator engageable with the edge of the tank inlet serves to open the valve against the spring force when the cap is seated on the tank inlet.

12 Claims, 7 Drawing Figures

U.S. Patent  Mar. 31, 1987  Sheet 1 of 3  4,653,552
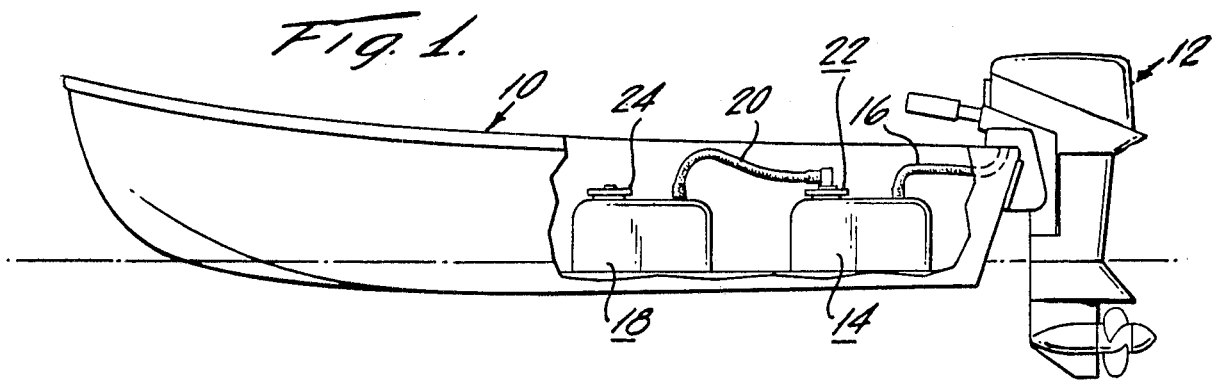
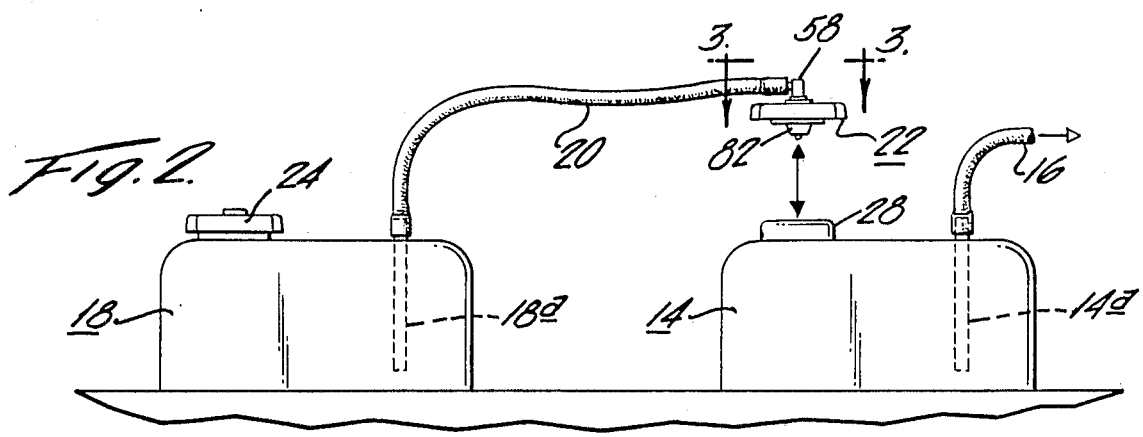
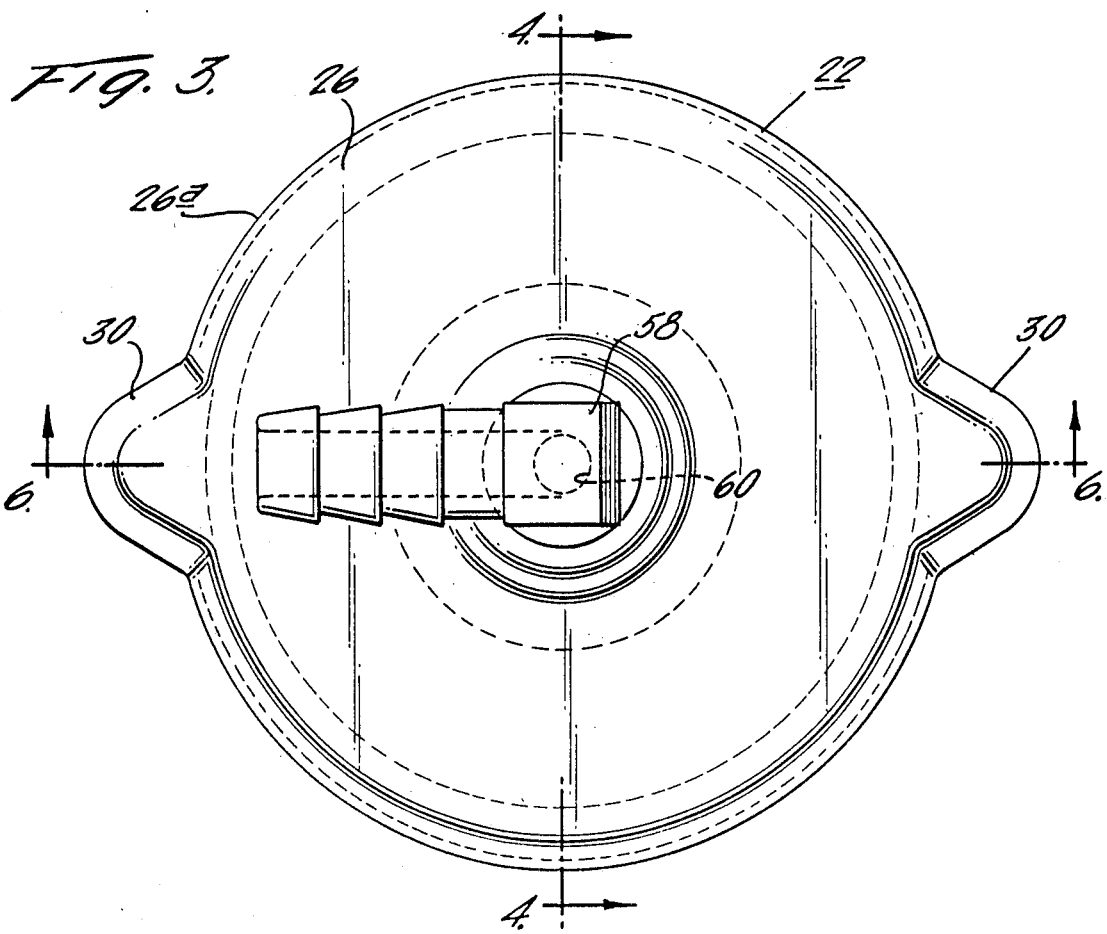

FUEL TANK CAP

BACKGROUND OF THE INVENTION

The present invention relates generally to fuel tank caps and relates more particularly to a fuel tank cap having a fuel inlet passage therein with automatic valve means for closing said fuel passage upon removal of the cap from a tank.

Fuel tank caps have long been employed to close the aperture through which fuel is introduced into the tank, which normally comprises a raised tank neck portion into which a fuel nozzle may be inserted. A variety of fuel tank caps have been proposed, some having threaded fastener elements for securing the cap to the tank, and others having locking ears cooperating with the tank neck flange in conjunction with a cap spring to hold the cap in place. Typically, fuel tank caps have some form of vent means to permit entrance of air into the tank as fuel is consumed, but preventing gas vapors from escaping into the atmosphere.

The present invention is directed particularly to fuel tank caps for portable marine fuel tanks of the type used with outboard motors. Such tanks typically have a capacity of about six gallons and are thus light enough to be portable even when filled. Their small capacity, however, limits the range of the boat if only a single tank is employed, and it has thus become common to utilize a plurality of such tanks either independently, or more desirably, ganged in series to extend the boat's range.

If the plurality of tanks are used independently, the engine may run out of fuel at an inopportune moment, preventing maneuverability of the boat until a new tank is connected. Such an interruption of power is potentially dangerous and, in any event, delays the progress of the boat's passage.

It is accordingly preferable to connect the plurality of tanks in series so that when a given tank becomes empty, fuel will be drawn from the next tank in the series. In U.S. Pat. No. 3,158,193, a fuel supply system is illustrated wherein fuel is drained first from the tank closest to the engine and then from the next closest tank, etc. In another system shown in U.S. Pat. No. 3,409,040, the fuel is drained first from the farthest tank from the engine followed by the next closest, etc.

Regardless of which type of system is used, a common feature of the ganged fuel tanks is a flexible fuel conduit joining one tank to another. To avoid requiring modification of the fuel tank, it is preferable to lead the fuel conduit from the fuel pick up tube of one tank through the fuel cap of the adjacent tank, which arrangement is shown in U.S. Pat. No. 3,409,040. A disadvantage of such a system is the spillage of fuel which is likely to occur when the filler cap is removed. Any fuel remaining in the fuel line will flow from the removed cap should be set down at a lower elevation than the remainder of the line. On boats, any fuel spillage is a matter of serious concern, since gasoline fumes being heavier than air will accumulate in the lowest region of the boat with the potential for explosion.

The present invention prevents such fuel spillage by providing automatic valve means which closes the fuel inlet passage in the valve cap upon removal of the cap from the fuel tank.

SUMMARY OF THE INVENTION

In the present cap construction, a valve is provided in the fuel inlet passage, the valve being spring biased toward a closed position. A valve actuator connected with the valve control member is engageable with the edge of the tank inlet upon application of the cap to the tank to open the valve against the spring force. The construction of the valve and actuator permit use of the cap with conventional fuel tanks.

It is accordingly a first object of the present invention to provide a fuel tank cap having a fuel inlet therein which is automatically closed by a valve in the cap upon removal of the cap from a fuel tank.

Another object of the invention is to provide a fuel tank cap as described which may be employed with conventional fuel tanks without modification thereof.

Still another object of the invention is to provide a fuel tank cap as described of a relatively simple construction which can be economically manufactured.

Additional objects and advantages of the invention will be more readily apparent from the following description of a preferred embodiment thereof.

BRIEF DESCRIPTION OF THE DRAWINGS

FIG. 1 is a side elevational view of a boat equipped with an outboard motor, the boat being broken away to show a pair of fuel tanks coupled in series to supply fuel to the motor, one of said tanks having a fuel inlet cap in accordance with the present invention;

FIG. 2 is an enlarged view of the tanks shown in FIG. 1 with the cap in accordance with the invention being shown removed from the tank inlet;

FIG. 3 is an enlarged plan view of the cap taken along line 3—3 of FIG. 2;

DESCRIPTION OF THE PREFERRED EMBODIMENT

Figure 4:
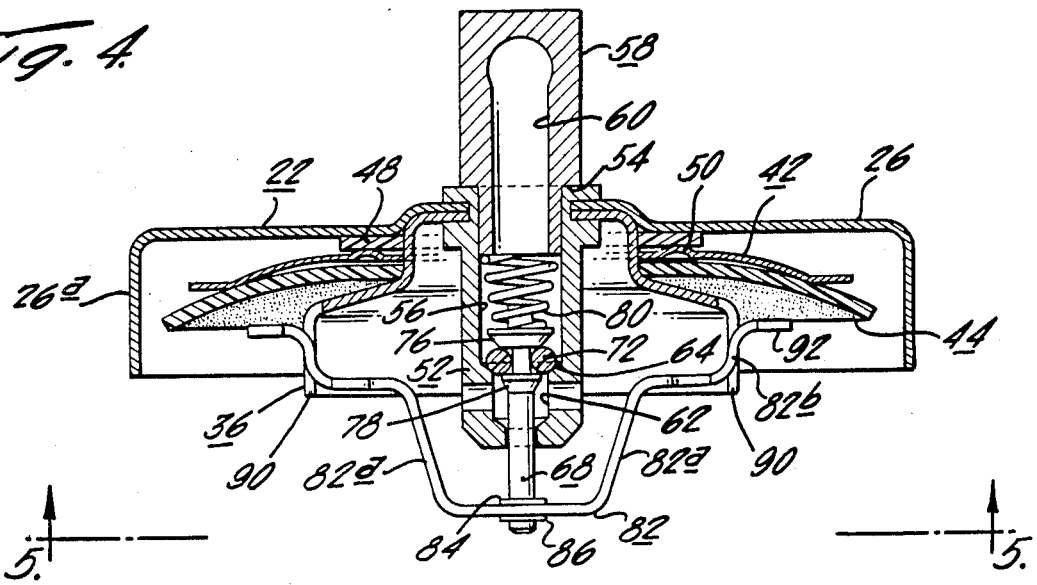
FIG. 4 is a sectional view through the cap taken along line 4—4 of FIG. 3.

Referring to the drawings and particularly FIGS. 1 and 2 thereof, a boat 10 equipped with an outboard motor 12 is shown having a fuel supply system comprising a first fuel tank 14 connected to the motor by a fuel line 16, and a second fuel tank 18 connected to the first tank by a fuel line 20. As shown in FIG. 2, the tanks 14 and 18 are equipped with fuel pick up tubes 14a and 18a respectively extending vertically therewithin nearly to the bottom of the tanks, which tubes are respectively coupled to the flexible fuel lines 16 and 20 at their extending upper ends.

The fuel line 20 feeds into the tank 14 through the tank fuel inlet cap 22, which cap, in accordance with the present invention, is equipped with an automatic valve for preventing fuel flow therethrough when the cap is removed from the tank. The construction of the cap 22 is shown in FIGS. 3-7 and described in detail hereinbelow.

Tank 18 is equipped with a conventional fuel inlet cap 24 including a vent valve to permit air to enter to replace fuel withdrawn from the tanks by the motor. Cap 22 is not vented, and accordingly fuel is withdrawn first from the tank 18, and upon emptying of tank 18, from tank 14. The fuel movement from the tanks into the motor 12 results from a pressure differential produced by the motor fuel pump as is conventional with this type of system. A conventional primer bulb (not shown) is included in the fuel line 16 to permit priming of the motor fuel pump.

Figure 5:
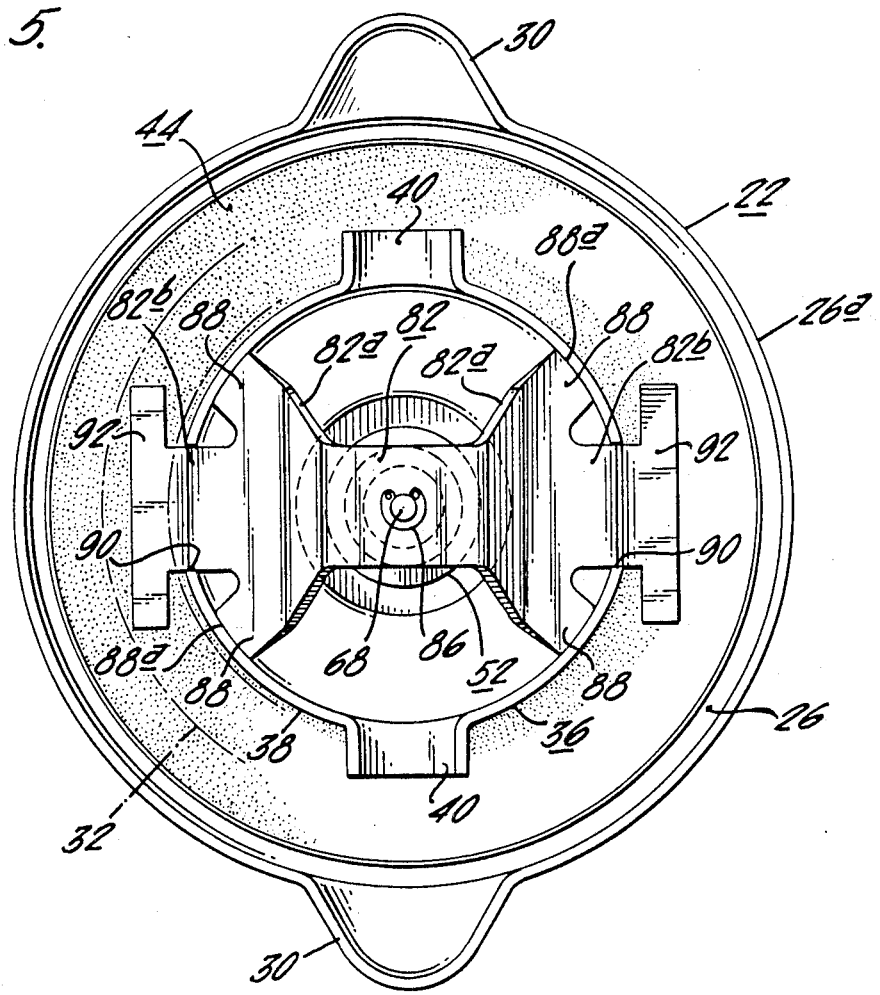
FIG. 5 is a bottom plan view of the cap taken along line 5—5 of FIG. 4.
Figure 6:
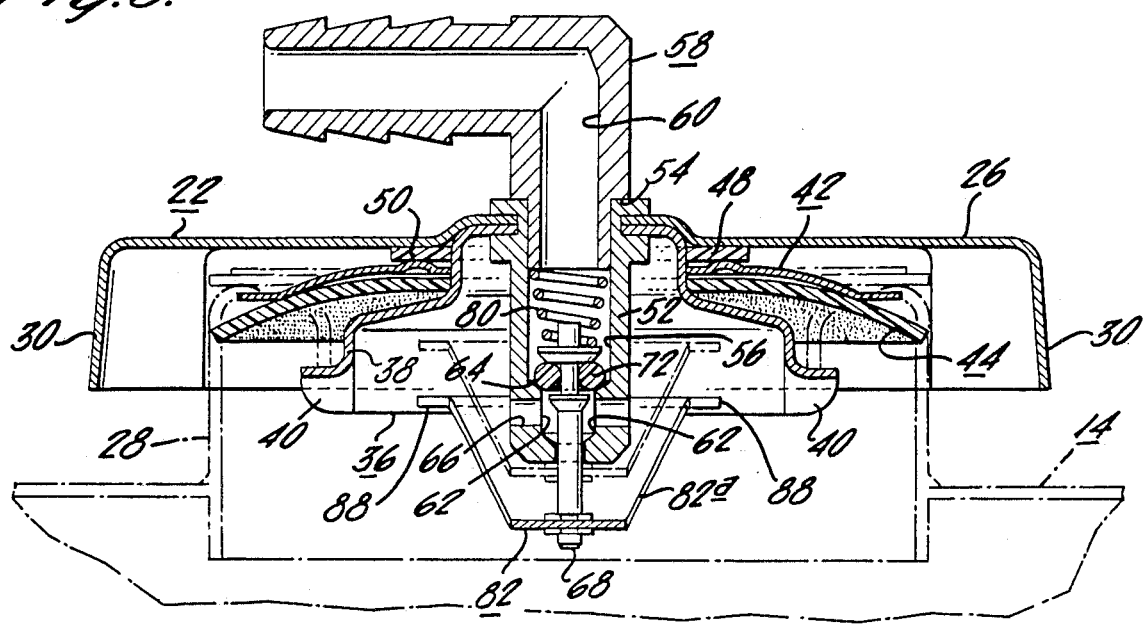
FIG. 6 is a sectional view of the cap taken along line 6—6 of FIG. 3 and showing in dot/dash lines the application of the cap to a fuel tank inlet.
Figure 7:
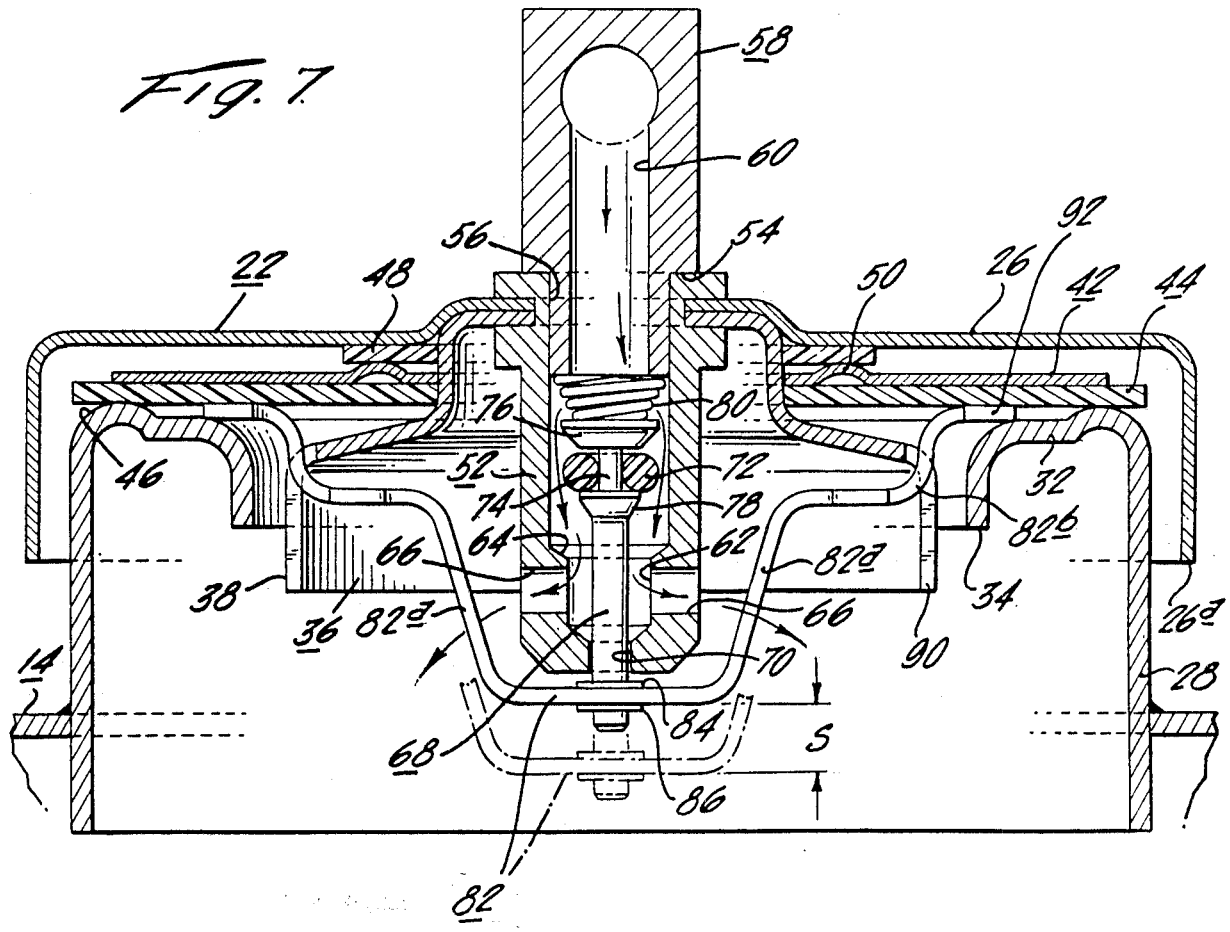
FIG. 7 is an enlarged sectional view similar to FIG. 4 but showing the cap applied to a tank inlet with the automatic valve in the open position.

With reference to FIGS. 3-7, the cap 22 includes an outer cap member 26 of a generally circular configuration having a downwardly extending skirt portion 26a adapted to cover the upper end of the cylindrical fuel tank fuel inlet neck 28 as shown in FIG. 7 wherein the cap is shown secured to the tank neck. As shown in FIGS. 3 and 5, the outer cap member 26 includes diametrically opposed lobes 30 to facilitate turning movement of the cap during its application and removal from the tank. As shown in FIG. 7, the tank neck includes an inwardly directed tank neck flange 32 which terminates in a downwardly directed flange edge 34.

The cap 22 is retained in position on the tank neck 28 by a locking collar 36 having an inverted cupped shape and which extends concentrically downwardly from the outer cap member 26 with a generally cylindrical wall portion 38 thereof disposed in inwardly spaced concentric relation with the tank neck flange 32 and extending below the edge 34 thereof. As shown in FIG. 6, a pair of opposed retaining ears 40 extending from the locking collar wall portion 38 extend radially outwardly beneath the tank neck flange inner edge 34. Slots (not shown) in the tank neck flange permit entry of the retaining ears which, upon rotation of the cap, engage the flange lower edge 34. The edge 34 is shaped in a conventional manner with ramp portions extending approximately 90° clockwise from the entrance slots for the ears 40, the ramp portions terminating in locking detents (not shown) to prevent the loosening of the applied cap. Such a construction is conventional not only with fuel tank caps but also radiator caps and the details thereof accordingly need not be described further.

An annular cap sealing spring 42 is disposed between the outer cap member 26 and the locking collar 36 and extends radially outwardly over the tank neck flange 32. An annular resilient gasket 44 disposed immediately beneath the spring 42 is biased by the spring into engagement with a rounded sealing edge 46 of the tank neck to effect a gas-tight sealing of the tank inlet when the filler cap is applied thereto. A smaller resilient seal ring 48 is disposed between the outer cap member 26 and an annular bead 50 of the spring 42 to complete the seal between the cap outer member 26 and the tank neck flange 32. The spring 42 acting against the tank flange 32 through gasket 44 holds the bars 40 of the locking collar tightly against the flange edge 34 and the detents therein to effectively secure the cap in place.

All of the above-described details of the cap and tank inlet and their manner of cooperation are essentially conventional and have been employed for many years in fuel tank closure assemblies. The automatic valve assembly, which in combination with the above-described structure, comprises the improvement of the present invention, will now be described in detail.

A fuel inlet valve housing 52 having a generally cylindrical hollow configuration is disposed concentrically with the described cap elements, extending at its upper end through the center of the outer cap member 26 and the locking collar 36, each of which is secured in sealing relation within a circular slot 54 thereof. A central cylindrical bore 56 of the valve housing 52 communicates at its upper end with a fuel inlet nipple 58 having a fuel inlet passage 60 therewithin. The attachment of the fuel line 20 to the nipple 58 as shown in FIG. 2 permits the flow of fuel from the tank 18 into the fuel passage 60 and valve housing bore 56.

Toward the bottom end of the housing 52, the bore 56 opens into a smaller concentric bore 62, the annular sloping shoulder between the bore 56 and bore 62 comprising a valve seat 64 for a valve mechanism to be described below. A plurality of transverse ports 66 in the housing 52 provide communication between the bore 62 and the interior of the tank neck to permit fuel flow thereinto when the cap is secured to the tank neck.

A valve control member for controlling fuel flow through the valve housing comprises a valve stem 68 concentrically disposed within the bores 56 and 62 of the housing with the lower end thereof extending through a bore 70 in the lower end of the housing. An O-ring 72 encircles a reduced diameter portion 74 of the valve stem 68 and is secured axially in position on the valve stem by respective upper and lower annular retainer elements 76 and 78. The retainer elements 76 and 78 are of a substantially smaller diameter than the housing bore 56 to permit fuel flow therearound in the raised position of the valve element as shown in FIG. 7.

A valve spring 80 in the form of a conical compression spring is disposed with its larger upper end bearing against the lower end of the nipple 58, and its smaller lower end bearing against the upper retainer element 76 to bias the valve stem 68 in a downward direction. As shown in FIGS. 4 and 6, when the cap is removed from the tank neck, the spring 80 serves to move the valve stem downwardly and compress the O-ring 72 between the upper retainer element 76 and the valve seat 64 of the housing, thereby sealing the lower end of housing bore 56 and preventing fuel flow therethrough.

A valve actuator 82 disposed beneath the valve housing 52 includes a bore therein for passage of the lower end of valve stem 68 to which it is attached by upper and lower snap rings 84 and 86 disposed in grooves in the valve stem. The actuator 82 as shown most clearly in FIGS. 4, 5 and 7 includes opposed upwardly extending arm portions 82a. A pair of guide fingers 88 extend laterally from the upper ends of each actuator arm portion, the ends 88a of which as shown in FIG. 5 are configured to conform closely to the inner surface of the cylindrical portion 38 of the retainer collar 36.

Outer arm portions 82b of the actuator arms 82a extend upwardly and outwardly from between the guide fingers 88 through opposed slots 90 in the wall portion 38 of the retainer 36. Lugs 92 extending from the outer ends of arm portions 82b are adapted to engage the upper surface of the tank neck flange 32 radially inwardly of the rounded sealing edge 46 as shown in FIG. 7 so as not to interfere with the interaction of the spring 42, gasket 44 and sealing edge 46.

Upon application of the cap to the tank neck, the engagement of the lugs 92 with the tank neck flange raises the valve stem 68 to the open valve position shown in FIG. 7 and holds the valve in this open position during the period of attachment of the cap to the tank neck. Upon removal of the cap from the tank, the spring 80 moves the valve stem downwardly to the closed position of FIG. 4, thus closing the fuel passage and preventing fuel in the fuel line from dripping from the open cap. The guide fingers 88 serve to maintain the valve stem 68 in concentrical alignment with the housing bore 56 and thus ensure a substantially concentric seating of the O-ring seal 72 with the valve seat 64 upon closure of the valve.

From the foregoing, it can be understood that the present invention provides an effective safeguard against fuel spillage from tank-connecting fuel lines by the provision of an automatically actuated valve in the fuel cap. Although the illustrations of FIGS. 1 and 2 show two tanks connected in series, it will be apparent that any desired number of tanks may be employed with each tank connecting hose having a fuel cap of the present type.

Manifestly, changes in details of construction can be effected by those skilled in the art without departing from the invention.

I claim:

1. In a fuel tank cap having a fuel inlet passage therein and means for detachably connecting said cap to a tank inlet in sealing engagement therewith, the improvement comprising a valve on said cap for automatically closing said fuel inlet passage upon removal of said cap from the tank inlet, said valve comprising a valve control member displaceable to open or close said fuel passage, spring means for biasing said control member toward a closed position of the fuel pasasge, and a valve actuator connected to said valve control member, said valve actuator being configured to engage the upper end of the tank inlet upon application of the cap thereto to thereby displace said valve control member against the force of said spring means to open said fuel passage.

2. In a fuel tank cap having a fuel inlet passage therein, said cap comprising an outer cap member, a locking collar secured to said cap member and having locking ears adapted for cooperative engagement with the tank neck flange upon rotation of the cap to secure the cap in position on the tank inlet neck, an annular cap spring and annular gasket disposed between said outer cap member and locking collar, said gasket being biased by said spring into sealing engagement with the tank inlet flange upon allication of the cap thereto, the improvement comprising a valve for automatically closing said fuel inlet passage upon removal of said cap from the tank inlet, said valve comprising a valve housing secured to said outer cap member and locking collar, a fuel passage in said valve housing communicating with said cap fuel inlet passage, a valve control member displaceable to open or close said fuel passage extending from said valve housing, spring means for biasing said valve control member toward a closed valve position to close said valve fuel passage, and an actuator connected to the extending end of said valve control member, said actuator being configured to engage the tank inlet flange upon application of the cap to the inlet neck to thereby displace said valve control member against the force of said spring means to open said fuel passage.

3. The invention as claimed in claim 2, wherein said valve housing fuel passage includes a valve seat therein, said valve control member comprising a valve stem extending within said valve fuel passage, and means on said valve stem for cooperatively engaging said valve seat to effect closure of said valve fuel passage upon movement of said valve stem to a valve closing position.

4. The invention as claimed in claim 3, wherein said means on said valve stem for cooperating with said valve seat comprises an annular resilient member.

5. The invention as claimed in claim 4, wherein said annular resilient member comprises an O-ring, said valve stem comprising a portion of reduced diameter for receiving said O-ring.

6. The invention as claimed in claim 5, wherein said valve stem includes spaced annular retainer elements for securing said O-ring in position, one of said retainer elements engaging said O-ring in sealing relation therewith upon closure of said valve.

7. The invention as claimed in claim 2, wherein said locking collar includes slots therein, and wherein said actuator includes arms extending through said locking collar slots.

8. The invention as claimed in claim 7, including lugs on the outer ends of said actuator arms, said lugs engaging said tank neck flange upon application of the cap to the tank inlet.

9. The invention as claimed in claim 7, including guide fingers on said actuator arms extending adjacent the locking collar to align said actuator with respect to said collar.

10. A fuel tank cap for attachment to the flanged cylindrical fuel inlet neck of a fuel tank, said cap comprising a substantially circular outer cap member, a cup-shaped locking collar extending concentrically downwardly from said outer cap member, said locking collar including a pair of diametrically opposed ears adapted to engage the lower edge of the tank neck flange to secure the cap to the tank neck, an annular cap spring and annular gasket concentrically disposed between said outer cap member and said locking collar, said gasket being biased by said spring into sealing engagement with the tank neck flange upon application of the cap thereto, a substantially cylindrical valve housing concentrically disposed with respect to said outer cap member and extending downwardly therefrom, said valve housing including a central, upwardly opening bore defining a fluid passage therein, a fluid inlet conduit connected with said valve housing bore to introduce fuel thereinto from a fuel source, a valve seat in said valve housing at the lower end of said fuel passage, passage means in said valve housing communicating with said valve seat opening externally of said valve housing, a valve stem disposed concentrically within said valve bore and having a lower end passing downwardly through said valve housing, an annular resilient member mounted on said valve stem and disposed for cooperative engagement with said valve seat for closing said fuel passage when said valve stem is moved downwardly to a valve closing position, a valve spring acting on said valve stem to urge said valve stem downwardly into a closed position, a valve actuator connected to the lower end of said valve stem beneath said housing, said actuator including a pair of opposed upwardly extending arms, guide fingers on each of said arms closely spaced from said locking collar to provide alignment of said actuator and the valve stem connected therewith, slots in said locking collar aligned with said actuator arms, extensions of said arms extending through said locking collar slots, and lugs on the outer ends of said arm extensions adapted for engagement with the tank neck flange upon application of the cap to the tank neck, the engagement of the actuator lugs with the tank neck moving the valve stem against the force of the valve spring to open the valve fuel passage, thereby permitting fuel to flow from the fuel inlet conduit through the valve into the tank inlet, the removal of the cap from the tank neck resulting in a closure of the valve stem under the influence of the valve spring, thereby closing the valve fuel passage.

11. The invention as claimed in claim 10, wherein said annular resilient member comprises an O-ring, said valve stem comprising a portion of reduced diameter for receiving said O-ring.

12. The invention as claimed in claim 10, wherein said valve stem includes spaced annular retainer elements for securing said O-ring in position, one of said retainer elements engaging said O-ring in sealing relation therewith upon closure of said valve.

* * * * *